(12) United States Patent
Nakano et al.

(10) Patent No.: US 12,043,877 B2
(45) Date of Patent: Jul. 23, 2024

(54) STEEL SHEET

(71) Applicant: NIPPON STEEL CORPORATION, Tokyo (JP)

(72) Inventors: Katsuya Nakano, Tokyo (JP); Yuji Sakiyama, Tokyo (JP); Takashi Yasutomi, Tokyo (JP); Yoshiaki Honda, Tokyo (JP); Masahiro Nakata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/012,882

(22) PCT Filed: Aug. 6, 2021

(86) PCT No.: PCT/JP2021/029441
§ 371 (c)(1),
(2) Date: Dec. 23, 2022

(87) PCT Pub. No.: WO2022/030641
PCT Pub. Date: Feb. 10, 2022

(65) Prior Publication Data
US 2023/0257844 A1   Aug. 17, 2023

(30) Foreign Application Priority Data

Aug. 7, 2020   (JP) .................. 2020-134691

(51) Int. Cl.
*C22C 38/00* (2006.01)
*C21D 3/04* (2006.01)
(Continued)

(52) U.S. Cl.
CPC ................ *C21D 9/46* (2013.01); *C21D 3/04* (2013.01); *C21D 6/005* (2013.01); *C21D 6/008* (2013.01);
(Continued)

(58) Field of Classification Search
CPC ... C22C 38/001; C22C 38/002; C22C 38/005; C22C 3/008; C22C 3/02; C22C 3/04;
(Continued)

(56) References Cited

U.S. PATENT DOCUMENTS

2020/0010919 A1   1/2020   Suzuki et al.
2020/0232060 A1   7/2020   Nakano et al.

FOREIGN PATENT DOCUMENTS

EP   3 584 344 A1   12/2019
EP   4 194 191 A1   6/2023
(Continued)

OTHER PUBLICATIONS

Hashimoto et al., JP3790087B2 Google Patents machine translation printed on Aug. 20, 2022, Jun. 28, 2006, entire translation (Year: 2006).*

*Primary Examiner* — Katherine A Christy
(74) *Attorney, Agent, or Firm* — Birch, Stewart, Kolasch & Birch, LLP

(57) ABSTRACT

A steel sheet includes a sheet thickness center part and a first surface layer softened part and a second surface layer softened part respectively arranged at two sides of the sheet thickness center part, wherein the first surface layer softened part and second surface layer softened part have 10 μm or more average thicknesses and have average Vickers hardnesses of 0.90 times or less of the average Vickers hardness of a sheet thickness ½ position, and the first surface layer softened part has an average Vickers hardness of 1.05 times or more the average Vickers hardness of the second surface layer softened part.

15 Claims, 3 Drawing Sheets

(51) Int. Cl.
  *C21D 6/00*   (2006.01)
  *C21D 8/02*   (2006.01)
  *C21D 9/46*   (2006.01)
  *C22C 38/02*   (2006.01)
  *C22C 38/04*   (2006.01)
  *C22C 38/06*   (2006.01)
  *C22C 38/08*   (2006.01)
  *C22C 38/10*   (2006.01)
  *C22C 38/12*   (2006.01)
  *C22C 38/14*   (2006.01)
  *C22C 38/16*   (2006.01)
  *C22C 38/18*   (2006.01)
  *C22C 38/60*   (2006.01)

(52) U.S. Cl.
  CPC ......... *C21D 8/0205* (2013.01); *C21D 8/0226* (2013.01); *C21D 8/0236* (2013.01); *C21D 8/0257* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/18* (2013.01); *C22C 38/60* (2013.01)

(58) Field of Classification Search
  CPC .... C22C 3/06; C22C 3/08; C22C 3/10; C22C 3/12; C22C 3/14; C22C 3/16; C22C 3/18
  USPC ........................................................ 428/600
  See application file for complete search history.

(56) References Cited

FOREIGN PATENT DOCUMENTS

| | | |
|---|---|---|
| JP | 2-301571 A | 12/1990 |
| JP | 3790087 B2 * | 6/2006 |
| WO | WO 2018/151331 A1 | 8/2018 |

* cited by examiner

STEEL SHEET

FIELD

The present invention relates to a steel sheet.

BACKGROUND

Steel sheet is generally assembled into various structures and supplied to their respective applications through cutting, bending, and other working steps, welding and other joining steps, and coating and other finishing steps. In the working steps, according to the working operations, various stresses may act upon the steel sheet or the quality of the steel sheet may change. Due to these, sometimes cracking or embrittlement occur. Therefore, steel sheet is generally required to have excellent characteristics for the specific working operations applied.

PTL 1 describes tensile strength 800 MPa or more high strength steel sheet comprising a sheet thickness center part and a surface layer softened part arranged on one side or both sides of the sheet thickness center part, wherein each surface layer softened part has a thickness of from more than 10 μm to 30% or less of the sheet thickness, an average Vickers hardness of each surface layer softened part is 0.60 time or less the average Vickers hardness of a sheet thickness ½ position, and a standard deviation of nanohardness of each surface layer softened part is 0.8 or less. Further, PTL 1 teaches that the bendability is improved by providing the surface layer softened part on one side or both sides of the steel sheet and suppressing variation in the microhardness of each surface layer softened part.

CITATIONS LIST

Patent Literature

[PTL 1] WO2018/151331

SUMMARY

Technical Problem

For working steel sheet, in addition to the bending such as described in PTL 1, there is also cutting, etc. As a specific example of the cutting, typically shearing is known. In shearing of steel sheet, in general, the steel sheet workpiece is placed between a punch and die and these are used to cut the steel sheet by the action of the shear force. In such a work process, sometimes tensile residual stress is caused at the sheared edge of the steel sheet. There is the problem that if the tensile residual stress becomes greater, the risk will rise of hydrogen embrittlement cracking occurring due to the hydrogen penetrating the steel from the outside environment.

The present invention was made in consideration of such a situation, and an object of the present invention is to provide a steel sheet able to reduce tensile residual stress occurring at a sheared edge at the time of shearing by a novel constitution.

Solution to Problem

To achieve the above object, the inventors studied the constitution of a steel sheet able to reduce the tensile residual stress occurring at a sheared edge at the time of shearing. As a result, the inventors discovered that by providing the two sides of steel sheet with surface layer softened parts having hardnesses lower than the sheet thickness center part of the steel sheet and further providing a difference in hardness between these surface layer softened parts, it is possible to reduce the tensile residual stress occurring at the sheared edge, and thereby completed the present invention.

The steel sheet for achieving the above object is as follows:

[1] A steel sheet comprising a sheet thickness center part and a first surface layer softened part and a second surface layer softened part respectively arranged at two sides of the sheet thickness center part, wherein
  the first surface layer softened part and second surface layer softened part have 10 μm or more average thicknesses and have average Vickers hardnesses of 0.90 time or less of the average Vickers hardness of a sheet thickness ½ position, and
  the first surface layer softened part has an average Vickers hardness of 1.05 times or more the average Vickers hardness of the second surface layer softened part.

[2] The steel sheet according to [1], wherein the first surface layer softened part has an average Vickers hardness of 2.00 times or more the average Vickers hardness of the second surface layer softened part.

[3] The steel sheet according to [1] or [2], wherein the first surface layer softened part has an average thickness smaller than the average thickness of the second surface layer softened part.

[4] The steel sheet according to [3], wherein the first surface layer softened part has an average thickness of ½ or less of the average thickness of the second surface layer softened part.

[5] The steel sheet according to any one of [1] to [4], wherein at least one of the first surface layer softened part and second surface layer softened part comprises an internal oxide layer.

[6] The steel sheet according to any one of [1] to [5], wherein the tensile strength is 980 MPa or more.

[7] The steel sheet according to [6], wherein the tensile strength is 1470 MPa or more.

[8] The steel sheet according to any one of [1] to [7], wherein the sheet thickness center part has a chemical composition comprising, by mass %,
  C: 0.050 to 0.800%,
  Si: 0.01 to 3.00%,
  Mn: 0.01 to 10.00%,
  Al: 0.001 to 0.500%,
  P: 0.100% or less,
  S: 0.050% or less,
  N: 0.010% or less,
  Cr: 0 to 3.000%,
  Mo: 0 to 1.000%,
  B: 0 to 0.0100%,
  Ti: 0 to 0.500%,
  Nb: 0 to 0.500%,
  V: 0 to 0.500%,
  Cu: 0 to 0.50%,
  Ni: 0 to 0.50%,
  O: 0 to 0.020%,
  W: 0 to 0.100%,
  Ta: 0 to 0.10%,
  Co: 0 to 0.50%,
  Sn: 0 to 0.050%,
  Sb: 0 to 0.050%,
  As: 0 to 0.050%,
  Mg: 0 to 0.050%,
  Ca: 0 to 0.050%, Y: 0 to 0.050%,
Zr: 0 to 0.050%,
La: 0 to 0.050%,
Ce: 0 to 0.050%, and
balance: Fe and impurities.

[9] The steel sheet according to [8], wherein the chemical composition comprises, by mass %, at least one selected from the group consisting of:
Cr: 0.001 to 3.000%,
Mo: 0.001 to 1.000%,
B: 0.0001 to 0.0100%,
Ti: 0.001 to 0.500%,
Nb: 0.001 to 0.500%,
V: 0.001 to 0.500%,
Cu: 0.001 to 0.50%,
Ni: 0.001 to 0.50%,
O: 0.0001 to 0.020%,
W: 0.001 to 0.100%,
Ta: 0.001 to 0.10%,
Co: 0.001 to 0.50%,
Sn: 0.001 to 0.050%,
Sb: 0.001 to 0.050%,
As: 0.001 to 0.050%,
Mg: 0.0001 to 0.050%,
Ca: 0.001 to 0.050%,
Y: 0.001 to 0.050%,
Zr: 0.001 to 0.050%,
La: 0.001 to 0.050%, and
Ce: 0.001 to 0.050%.

Advantageous Effects of Invention

According to the present invention, it is possible to provide a steel sheet able to reduce tensile residual stress occurring at a sheared edge at the time of shearing.

DESCRIPTION OF EMBODIMENTS

<Steel Sheet>

The steel sheet according to one embodiment of the present invention comprises a sheet thickness center part and a first surface layer softened part and a second surface layer softened part respectively arranged at two sides of the sheet thickness center part, wherein
the first surface layer softened part and second surface layer softened part have 10 μm or more average thicknesses and have average Vickers hardnesses of 0.90 time or less of the average Vickers hardness of a sheet thickness ½ position, and
the first surface layer softened part has an average Vickers hardness of 1.05 times or more the average Vickers hardness of the second surface layer softened part.

Figure 1:
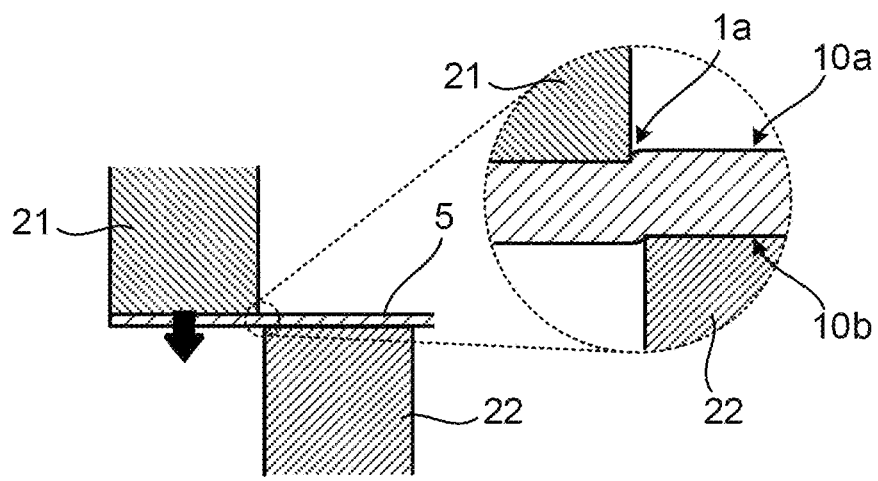
FIG. 1 is a schematic view for explaining one example of a mechanism of formation of a sheared edge in the case of shearing a steel sheet.
Figure 1:
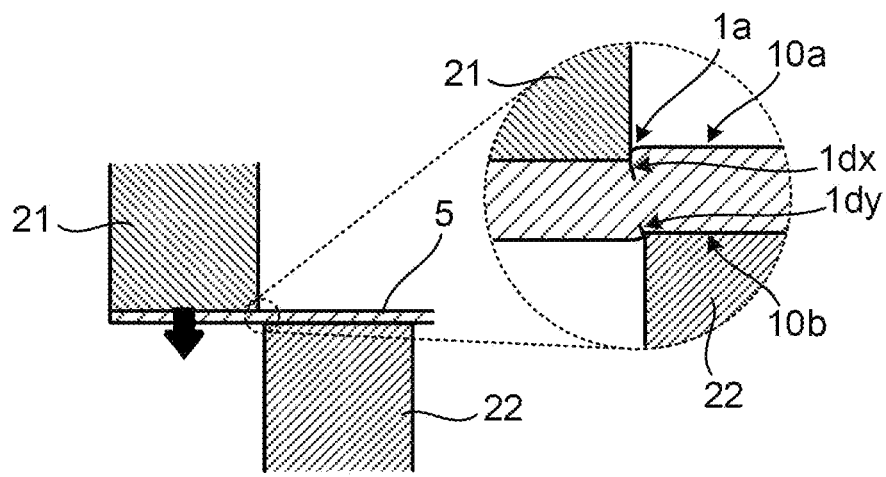
Figure 1:
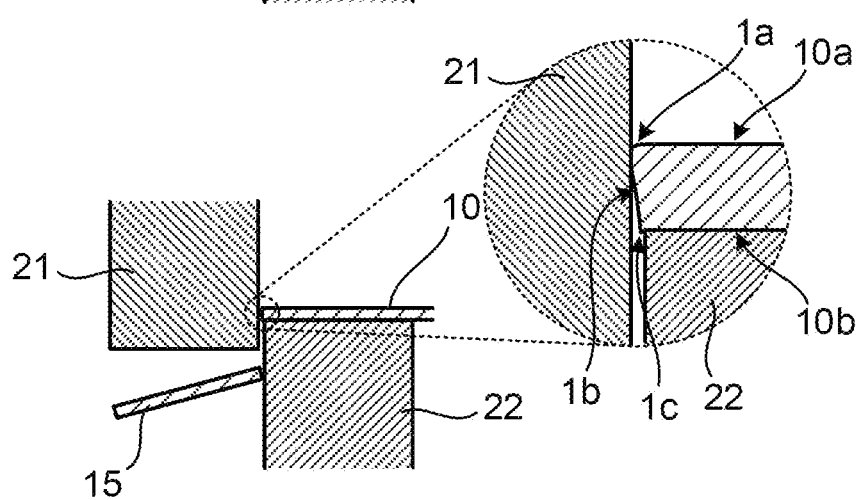

FIG. 1 is a schematic view for explaining one example of a mechanism of formation of a sheared edge in the case of shearing a steel sheet. In shearing of a steel sheet, generally, as shown in FIG. 1(A), a first surface 10$a$ of a workpiece comprised of the steel sheet 5 is pressed by a cutting edge of a first blade 21 (for example, a punch). In the process until the cutting edge of the first blade 21 cuts into the steel sheet 5, a droop 1$a$ is formed on the first surface 10$a$ side. Next, in the process of the cutting edge of the first blade 21 cutting into the steel sheet 5, the sheared surface 1$e$ (see FIG. 3) is formed. After the droop 1$a$ and the sheared surface 1$e$ are formed, as shown in FIG. 1(B), the first crack 1$dx$ is generated from the first blade 21 side toward the second blade 22 (for example the die) side. On the other hand, at the second blade 22 side as well, in the same way, the second surface 10$b$ of the steel sheet 5 is cut into by the cutting edge of the second blade 22, whereby the second crack 1$dy$ is generated from the second blade 22 side toward the first blade 21 side. Finally, as shown in FIG. 1(C), the first crack 1$dx$ and the second crack 1$dy$ grow and merge with each other, whereupon the fracture surface 1$b$ is formed. Further, by making the first blade 21 and the second blade 22 further move, the steel sheet 5 is separated into scrap 15 and the target product workpiece 10. At that time, as shown in FIG. 1(C), in the sheared edge 1 of the workpiece 10, a burr 1$c$ is generally formed at the edge at the second blade 22 side.

In the sheared edge 1 formed in the above way, due to the damage and warping, etc., caused by the shearing, compressive residual stress and tensile residual stress can be formed. If there is a large tensile residual stress at the sheared edge 1, sometimes the hydrogen embrittlement resistance of the sheared edge 1 falls and hydrogen embrittlement cracking occurs. "Hydrogen embrittlement cracking" means the phenomenon of a steel member suddenly fracturing due to hydrogen penetrating the steel from the outside environment and is also referred to as delayed fracture, etc. Hydrogen embrittlement cracking generally easily occurs at locations where stress concentrates, in particular is known to easily occur at a location where tensile residual stress is present. Further, in shearing, generally, in the sheared edge 1, the highest tensile strength tends to occur at the fracture surface 1$b$. Therefore, to avoid in advance the problem of hydrogen embrittlement cracking due to shearing, it is important in particular to reduce the tensile residual stress occurring at the fracture surface 1$b$ in the tensile residual stress occurring at the sheared edge 1.

In relation to this, the inventors engaged in numerous experiments and analyses repeatedly regarding the relationship between the conditions of shearing of the steel sheet 5 and the properties of the sheared edge 1 formed by the shearing and as a result obtained the following new discovery.

Figure 2:
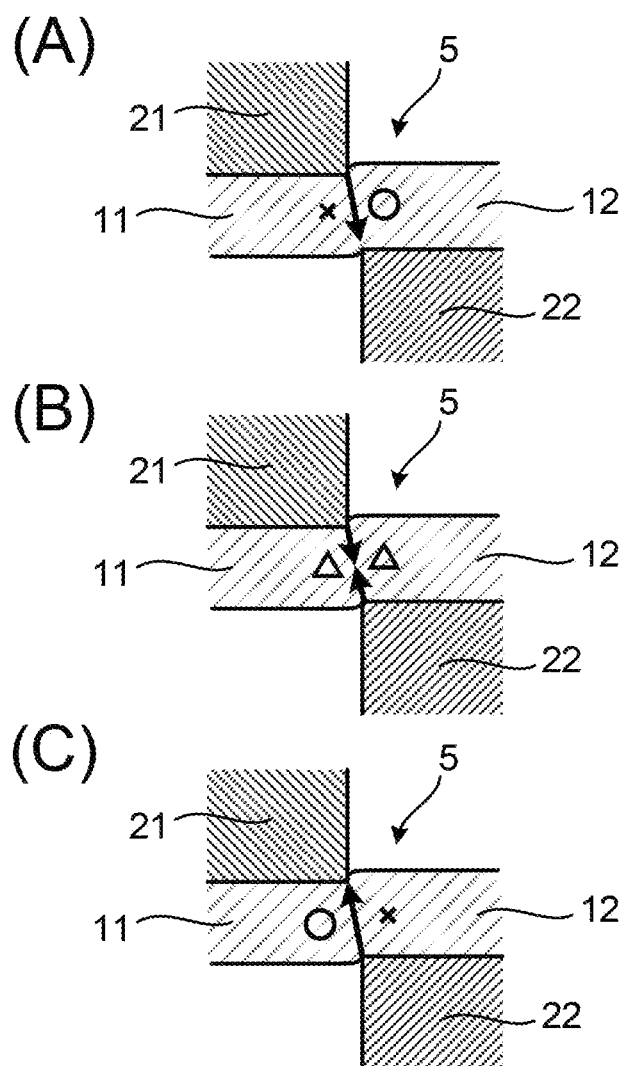
FIG. 2 is a schematic view for explaining a new discovery obtained by the inventors, wherein (A) shows a case of causing the growth of a crack from a first blade, (B) shows a case of causing growth of a crack from a first blade and second blade, and (C) shows a case of causing growth of a crack from a second blade.

FIG. 2 is a schematic view for explaining a new discovery obtained by the inventors. In the figure, "○" means a small tensile residual stress, "Δ" means a medium extent tensile residual stress, and "x" means a large tensile residual stress. As shown in FIG. 2(A) to (C), the case of punching one part 11 of the steel sheet 5 by the first blade 21 and punching another part 12 of the steel sheet 5 by the second blade 22 will be explained. In this case, as shown in FIG. 2(A), if a crack preferentially grows from the first blade 21 side, the tensile residual stress at the sheared edge of the one part 11 becomes larger. On the other hand, the tensile residual stress at the sheared edge of the other part 12 becomes smaller. In other words, the one part 11 can be made scrap 15, while the other part 12 can be suitably employed as the product (workpiece 10). Further, as shown in FIG. 2(B), if cracks equivalently grow from both the first blade 21 side and the second blade 22 side, equivalent tensile residual stress can be generated at the sheared edges of both of the one part 11 and other part 12. In other words, variation of characteristics at the one part 11 and the other part 12 can be suppressed. Therefore, it can be said to be suitable when employing both the one part 11 and other part 12 as the product. Furthermore, as shown in FIG. 2(C), if a crack preferentially grows from the second blade 22 side, the tensile residual stress at the sheared edge of the other part 12 becomes larger. On the other hand, the tensile residual stress at the sheared edge of the one part 11 becomes smaller. In other words, the other part 12 can be made scrap 15, while the one part 11 can be suitably employed as the product (workpiece 10).

Figure 3:
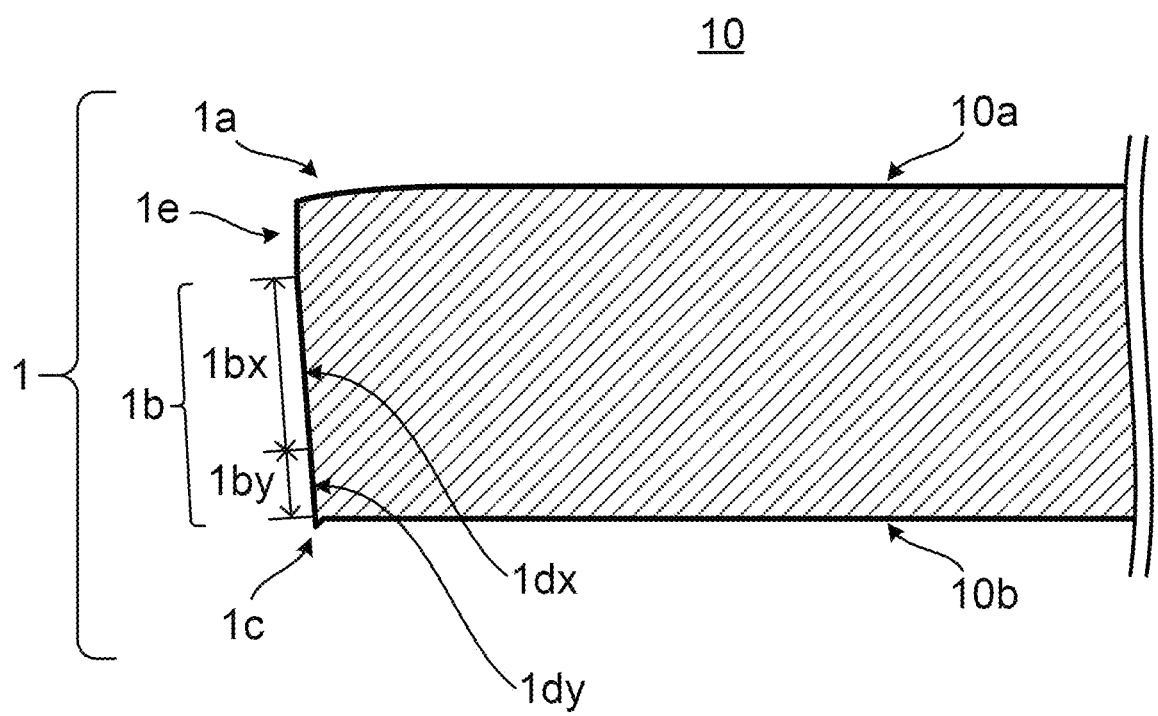
FIG. 3 is a schematic enlarged view showing one example of a sheared edge part of a workpiece corresponding to FIG. 2(A).

FIG. 3 is a schematic enlarged view showing one example of the sheared edge 1 part of the workpiece 10 (other part 12) corresponding to FIG. 2(A). Referring to FIG. 3, the droop 1*a*, the fracture surface 1*b*, the burr 1*c*, and the sheared surface 1*e* are formed on the sheared edge 1. The fracture surface 1*b* includes a first part 1*bx* and a second part 1*by*. The first part 1*bx* is formed by the first crack 1*dx* growing from the droop 1*a* side to the burr 1*c* side, while the second part 1*by* is formed by the second crack 1*dy* proceeding from the burr 1*c* side to the droop 1*a* side. At the sheared edge 1 of FIG. 3, due in part to the preferential crack growth from the first blade 21 side, the area ratio of the first part 1*bx* in the fracture surface 1*b* becomes larger than the area ratio of the second part 1*by* in the fracture surface 1*b*.

From the above, the following (1) to (3) can be said:

(1) In the sheared edge 1, the tensile residual stress occurring at the fracture surface 1*b* changes depending on the directions of growth and lengths of the cracks 1*dx*, 1*dy* forming the fracture surface 1*b*.

(2) At the fracture surface 1*b*, the longer the crack 1*dx* growing from the droop 1*a* side, the smaller the tensile residual stress of the fracture surface 1*b* of the workpiece 10 and the larger the tensile residual stress of the fracture surface of the scrap 15.

(3) In other words, if, at the fracture surface 1*b* of the workpiece 10, the area ratio of the part derived from the first crack 1*dx* growing from the droop 1*a* side is larger than the area ratio of the part derived from the second crack 1*dy* growing from the burr 1*c* side, compared with when the area ratio of the part derived from the first crack 1*dx* growing from the droop 1*a* side is smaller than the area ratio of the part derived from the second crack 1*dy* growing from the burr 1*c* side, it is possible to relatively reduce the tensile residual stress of the fracture surface 1*b*.

Based on the discoveries of the above (1) to (3), the inventors further studied the configuration of a steel sheet 5 able to reduce the tensile residual stress occurring at the sheared edge 1 of the workpiece 10, in particular, the fracture surface 1*b*, obtained by preferentially growing the crack from the first surface 10*a* of the steel sheet 5 corresponding to the first blade 21 (generally, the punch) side. As a result, the inventors discovered that by providing a first surface layer softened part (for example the first surface 10*a* side) and a second surface layer softened part (for example the second surface 10*b* side) having hardnesses lower than the sheet thickness center part of the steel sheet 5 at the two sides of the steel sheet 5 and further providing a difference in hardness between the surface layer softened parts, more specifically by making the average Vickers hardness of the first surface layer softened part 1.05 times or more of the average Vickers hardness of the second surface layer softened part, it is possible to preferentially grow a crack from the first surface layer softened part side with a relatively large hardness when shearing the steel sheet 5 and thereby possible to remarkably reduce the tensile residual stress occurring at the sheared edge 1 of the workpiece 10 (steel sheet 5), in particular the fracture surface 1*b*. Therefore, according to the steel sheet of the present invention, it becomes possible to remarkably improve the hydrogen embrittlement resistance of the sheared edge at the workpiece obtained by the shearing.

Below, steel sheets according to embodiments of the present invention will be explained in detail, but the explanation of these is intended just to illustrate preferred embodiments of the present invention and is not intended to limit the present invention to such specific embodiments.

(First Surface Layer Softened Part and Second Surface Layer Softened Part)

According to one embodiment of the present invention, the first surface layer softened part and second surface layer softened part respectively independently have 10 μm or more average thicknesses and have average Vickers hardnesses of 0.90 time or less of the average Vickers hardness of the sheet thickness ½ position. By having 10 μm or more average thicknesses, it is possible to sufficiently obtain the effects of provision of surface layer softened parts at the two sides of the steel sheet. So long as satisfying the requirement explained in detail later that the first surface layer softened part have an average Vickers hardness of 1.05 times or more of the average Vickers hardness of the second surface layer softened part, the average thicknesses of the first surface layer softened part and the second surface layer softened part may respectively be any values of 10 μm or more. The values of the two may be the same or may be different. For example, the average thicknesses of the first surface layer softened part and the second surface layer softened part may respectively independently be 15 μm or more, 30 μm or more, 40 μm or more, 50 μm or more, 70 μm or more, or 100 μm or more. The upper limits are not particularly set, but generally the average thicknesses of the first surface layer softened part and the second surface layer softened part are 30% or less of the sheet thickness. For example, the average thicknesses of the first surface layer softened part and the second surface layer softened part may be 25% or less, 20% or less, 15% or less, or 10% or less of the sheet thickness, more specifically 450 μm or less, 400 μm or less, 300 μm or less, 250 μm or less, 200 μm or less, or 150 μm or less.

Similarly, so long as satisfying the requirement that the first surface layer softened part have an average Vickers hardness of 1.05 times or more of the average Vickers hardness of the second surface layer softened part, the average Vickers hardnesses of the first surface layer softened part and the second surface layer softened part may respectively be any average Vickers hardnesses of 0.90 time or less of the average Vickers hardness of the sheet thickness ½ position. By controlling the average Vickers hardness of the first surface layer softened part and the second surface layer softened part to 0.90 time or less of the average Vickers hardness of the sheet thickness ½ position, i.e., by lowering the hardness of the surface layer parts with respect to the sheet thickness center part, it is possible to improve the bendability of the steel sheet and accordingly it is possible to obtain steel sheet excellent in formability. To further enhance the effect of improvement of such bendability, for example, the average Vickers hardnesses of the first surface layer softened part and the second surface layer softened part may respectively independently be 0.85 time or less, 0.80 time or less, 0.70 time or less, or 0.60 time or less of the average Vickers hardness of the sheet thickness ½ position. The lower limits are not particularly set, but generally the average Vickers hardnesses of the first surface layer softened part and the second surface layer softened part are 0.1 time or more of the average Vickers hardness of the sheet thickness ½ position, for example, 0.2 time or more.

In the present invention, "the average thicknesses of the first surface layer softened part and the second surface layer softened part" and "the average Vickers hardnesses of the first surface layer softened part and the second surface layer softened part" are determined in the following way. Explaining specifically the average thickness and the average Vickers hardness of the first surface layer softened part, first, the Vickers hardnesses at the sheet thickness direction positions are measured by a pressing load of 100 g from the sheet thickness ½ position of the steel sheet toward the surface of the first surface layer softened part side at certain intervals of the sheet thickness direction (for example, every 5% of the sheet thickness, if necessary, every 3%, every 2.5%, every 1%, or every 0.5%), next the Vickers hardnesses at a total of three points or more, for example, five points or 10 points, are similarly measured by a pressing load of 100 g from those positions in a direction vertical to the sheet thickness on a line parallel to the rolling direction, and the average value of these is made the average Vickers hardness at that sheet thickness direction position. The intervals of the measurement points aligned in the sheet thickness direction and the rolling direction, when possible, are preferably a distance of 4 times or more of the indentations. A "distance of 4 times or more of the indentations" means a distance of 4 times or more of the length of a diagonal at a rectangular opening of an indentation formed by a diamond indenter when measuring the Vickers hardness. If difficult to make the intervals of the measurement points a distance of 4 times or more of the indentations while striking the surface in the sheet thickness direction in a line, it is also possible to make the intervals of the measurement points a distance of 4 times or more of the indentations and strike the surface in the sheet thickness direction in a zigzag pattern. When the average Vickers hardness at a certain sheet thickness direction position becomes 0.90 time or less of the similarly measured average Vickers hardness at the sheet thickness ½ position, the surface side from that position is defined as a first surface layer softened part. The average thickness of the first surface layer softened part (µm) and its ratio (%) in the sheet thickness are determined. In the thus determined first surface layer softened part, the Vickers hardnesses of a random 10 points in it are measured by a pressing load of 100 g and the average value of these is calculated so as to determine the average Vickers hardness of the first surface layer softened part. The second surface layer softened part as well is measured in the same way as the first surface layer softened part so as to determine the average thickness and average Vickers hardness of the second surface layer softened part. (Average Vickers Hardness of First Surface Layer Softened Part/Average Vickers Hardness of Second Surface Layer Softened Part≥1.05)

According to this embodiment of the present invention, the first surface layer softened part has an average Vickers hardness of 1.05 times or more of the average Vickers hardness of the second surface layer softened part. By using a steel sheet having such a constitution in shearing, it is possible to preferentially grow a crack from the relatively large hardness first surface layer softened part side and as a result it becomes possible to reduce the tensile residual stress occurring at the sheared edge. For example, in the previously explained WO2018/151331, it is taught that to improve the bendability of the high strength steel sheet, a surface layer softened part is arranged at one side or both sides of the sheet thickness center part. However, the technical idea of providing the two sides of the steel sheet with a first surface layer softened part and a second surface layer softened part having hardnesses lower than the sheet thickness center part of the steel sheet and, furthermore, providing a difference in hardness between these surface layer softened parts, more specifically by giving the first surface layer softened part an average Vickers hardness of 1.05 times or more of the average Vickers hardness of the second surface layer softened part so as to preferentially grow a crack from the relatively large hardness first surface layer softened part side at the time of shearing and reduce the tensile residual stress occurring at the sheared edge has not existed up to now. This was first discovered by the inventors this time.

From the viewpoint of more reliably preferentially growing a crack from the first surface layer softened part side, the difference between the average Vickers hardness of the first surface layer softened part and the average Vickers hardness of the second surface layer softened part (ratio of average Vickers hardness of the first surface layer softened part/ average Vickers hardness of second surface layer softened part) should be larger. Therefore, the average Vickers hardness of the first surface layer softened part is preferably 1.06 time or more, 1.08 time or more, or 1.10 time or more of the average Vickers hardness of the second surface layer softened part, more preferably 1.12 time or more, 1.14 time or more, 1.16 time or more, 1.18 time or more, or 1.20 time or more, still more preferably 1.30 time or more or 1.50 time or more, most preferably 1.80 time or more or 2.00 time or more. The upper limit value is not particularly set, but generally the average Vickers hardness of the first surface layer softened part may be 20.0 times or less of the average Vickers hardness of the second surface layer softened part, for example, may be 10.0 time or less or 5.0 time or less.

The technique for controlling the average Vickers hardness of the first surface layer softened part and the average Vickers hardness of the second surface layer softened part to the above such relationship is not particularly limited, but, for example, providing a difference in chemical composition and/or microstructure between the first surface layer softened part and the second surface layer softened part may be mentioned. More specifically, it is possible to change the contents of some of the elements of the chemical composition (for example, in particular the contents of at least one of the elements of C, Mn, Cr, Mo, B, Cu, and Ni relating to the strength of the steel sheet) between the first surface layer softened part and second surface layer softened part and make the average Vickers hardness of the first surface layer softened part 1.05 times or more of the average Vickers hardness of the second surface layer softened part. Alternatively, further, it is also possible to control the average Vickers hardness of the first surface layer softened part and the average Vickers hardness of the second surface layer softened part to the desired relationship by raising the ratio of the hard structures in the first surface layer softened part (for example, bainite, martensite, etc.) over the second surface layer softened part.

Alternatively, further, if the first surface layer softened part and second surface layer softened part have hardness distributions, it is possible to provide a difference between the average thickness of the first surface layer softened part and the average thicknesses of the second surface layer softened part so as to make the average Vickers hardness of the first surface layer softened part 1.05 times or more of the average Vickers hardness of the second surface layer softened part. More specifically, for example, by softening the surface parts of the steel sheet by decarburization, etc., so as to form the first surface layer softened part and second surface layer softened part at the two sides of the steel sheet, the first surface layer softened part and second surface layer softened part become lower in concentrations of carbon the closer to the surfaces, therefore generally have hardness distributions becoming lower in Vickers hardness the closer to the surfaces corresponding to this. Therefore, if the first surface layer softened part and second surface layer softened part have such hardness distributions, for example, it is also possible to remove part of the surface side of the first surface layer softened part by wire-brushing, etc., to make the first surface layer softened part have an average thickness smaller than the average thickness of the second surface layer softened part. Due to this, the surface part of the first surface layer softened part having the lower Vickers hardness is removed, therefore it is possible to make the average Vickers hardness of the first surface layer softened part higher than the average Vickers hardness of the second surface layer softened part. In this case, from the viewpoint of more reliably preferentially growing a crack from the first surface layer softened part side, the average thickness of the first surface layer softened part is preferably smaller than the average thickness of the second surface layer softened part. Specifically, the average thickness of the first surface layer softened part is preferably ⅘ time or less (0.8 time or less) of the average thickness of the second surface layer softened part, more preferably ¾ or less (0.75 time or less), most preferably ½ or less (0.5 time or less). Regardless of whether the first surface layer softened part and second surface layer softened part have hardness distributions, the average thickness of the first surface layer softened part may be ⅘ or less (0.8 time or less), ¾ or less (0.75 time or less), or ½ or less (0.5 time or less) of the average thickness of the second surface layer softened part. Further, if illustrated by the difference between the average thicknesses of the first surface layer softened part and the second surface layer softened part, for example, the value of the average thickness of the second surface layer softened part minus the average thickness of the first surface layer softened part may be 5 μm or more, 10 μm or more, 20 μm or more, 30 μm or more, 40 μm or more, or 50 μm or more and/or may be 300 μm or less, 200 μm or less, 150 μm or less, or 100 μm or less.

(At Least One of First Surface Layer Softened Part and Second Surface Layer Softened Part Including Internal Oxide Layer)

As explained above, for example, if using decarburization, etc., to soften the surface parts of steel sheet and form a first surface layer softened part and second surface layer softened part, sometimes oxygen from a scale layer formed mainly from FeO present on the steel sheet or from the outside atmosphere diffuses into the steel and bonds with the Si, Mn, or other elements to form internal oxides near the surfaces of the steel sheet. Therefore, in a specific embodiment of the present invention, at least one of or both of the first surface layer softened part and second surface layer softened part may contain an internal oxide layer comprised of such internal oxides. If a surface layer softened part includes an internal oxide layer, the thickness of the internal oxide layer may generally be smaller than the thickness of the surface layer softened part. Therefore, for example, as explained above, if making the average thickness of the first surface layer softened part smaller than the average thickness of the second surface layer softened part by removing part of the surface side of the first surface layer softened part by wire-brushing, etc., sometimes the internal oxide layer which had been present near the surface of the first surface layer softened part will be ground off. In such a case, only the second surface layer softened part may include an internal oxide layer.

An internal oxide layer means a layer including a region in which granular oxides including Si, Mn, and/or Al are dispersed inside the steel sheet. It can be observed by measuring a polished surface of the steel sheet cross-section by a 1000× or more power by an SEM-EDX (scanning electron microscope-energy dispersive X-ray spectrometry). An SEM image is not a usual secondary electron image. A backscattered electron image enables the thickness of an internal oxide layer to be observed more clearly. Further, as a simple method for observing an internal oxide layer, observation of the steel sheet cross-section, polished to a mirror surface, by a 1000× or so power by an optical microscope may be mentioned.

In addition to the presence of an internal oxide layer, it is possible to quantify the degree of internal oxidation by, for example, using a high frequency glow discharge spectrometry apparatus (high frequency GDS). Explained more specifically, if a surface layer softened part includes an internal oxide layer, if using high frequency GDS to analyze the emission intensity of the wavelength indicating Si in a sheet thickness (depth) direction from the steel sheet surface, a peak of emission intensity of the wavelength indicating Si appears in the depth region of more than 0.2 μm to 10.0 μm or less from the steel sheet surface. This means that the steel sheet is internally oxidized and there is an internal oxide layer including Si oxides in the depth region of more than 0.2 μm to 10.0 μm or less from the steel sheet surface. Therefore, it is possible to quantify the degree of internal oxidation by measuring the emission intensity ratio $I_{max}/I_{ave}$ between the maximum emission intensity $I_{max}$ at the depth region of more than 0.2 μm to 10.0 μm or less from the steel sheet surface due to the Si oxides and the average value of the emission intensity $I_{ave}$ at the depth region of 10.0 μm or more and 15.0 μm or less from the steel sheet surface where there are no internal oxides present or they are relatively scarce.

According to a specific embodiment of the present invention, if at least one of the first surface layer softened part and second surface layer softened part includes an internal oxide layer, the internal oxide layer, when measured using high frequency GDS, may have a 1.3 or more emission intensity ratio $I_{max}/I_{ave}$. Here, $I_{max}$ means the maximum emission intensity due to Si oxides at the depth region of more than 0.2 μm to 10.0 μm or less from the steel sheet surface, while $I_{ave}$ means the average value of the emission intensities at the depth region of 10.0 μm or more and 15.0 μm or less from the steel sheet surface. For example, the internal oxide layer may have an emission intensity ratio $I_{max}/I_{ave}$ of 1.4 or more, 1.5 or more, 1.6 or more, 1.7 or more, 1.8 or more, or 2.0 or more. The upper limit value of the emission intensity ratio $I_{max}/I_{ave}$ is not particularly set. For example, the internal oxide layer may also have an emission intensity ratio $I_{max}/I_{ave}$ of 3.0 or less, 2.7 or less, or 2.5 or less.

The emission intensity ratio $I_{max}/I_{ave}$ is measured by high frequency GDS by rendering the steel sheet surface an argon atmosphere, applying voltage to create glow plasma, and in that state sputtering the steel sheet surface while analyzing the composition in the depth direction. It is possible to identify elements contained in the steel sheet from the emission spectrum wavelengths unique to the elements emitted by excitation of atoms in glow plasma and obtain quantitative data of elements contained in the steel sheet from the emission intensities of the identified elements. Data in the depth direction can be obtained from the sputter time. Specifically, by using standard samples to find the relationship between the sputter time and sputter depth in advance, it is possible to convert the sputter time to the sputter depth. It is possible to define the sputter depth converted from the sputter time as the depth from the steel sheet surface. Based on the depth from the steel sheet surface defined in the above way, the emission intensity ratio $I_{max}/I_{ave}$ is determined from the maximum emission intensity $I_{max}$ derived from the Si oxides at the depth region of more than 0.2 μm and 10.0 μm or less from the steel sheet surface measured by high frequency GDS, and the average value $I_{ave}$ of similarly the emission intensity in the depth region of 10.0 μm or more and 15.0 μm or less from the steel sheet surface is determined.

(Sheet Thickness Center Part and Preferable Chemical Composition)

In this embodiment of the present invention, the sheet thickness center part may be any material satisfying the requirement that the average Vickers hardnesses of the first surface layer softened part and the second surface layer softened part be 0.90 time or less of the average Vickers hardness of the sheet thickness center part corresponding to the sheet thickness ½ position. Therefore, the chemical composition of the sheet thickness center part is not particularly limited and may be any suitable chemical composition. More specifically, as explained above, the present invention has as its object to provide steel sheet able to reduce the tensile residual stress occurring at the sheared edge at the time of shearing. The object is achieved by providing a first surface layer softened part and second surface layer softened part having hardnesses lower than the sheet thickness center part of the steel sheet at the two sides of the steel sheet and, further, providing a difference in hardness between these surface layer softened parts, more specifically controlling the first surface layer softened part to have an average Vickers hardness of 1.05 times or more the average Vickers hardness of the second surface layer softened part. Therefore, the chemical composition of the steel sheet, in particular the chemical composition of the sheet thickness center part and the later explained chemical compositions of the first surface layer softened part and second surface layer softened part, clearly is not a technical feature essential for achieving the object of the present invention. Below, the preferable chemical composition of the sheet thickness center part applied to the steel sheet according to one embodiment of the present invention will be explained in detail, but the explanation of these is intended as just an illustration and is not intended to limit the present invention to a sheet thickness center part having such a specific chemical composition. Further, near the interface with the surface layer part at the sheet thickness center part, sometimes the chemical composition will differ from a position sufficiently far from the interface due to diffusion of alloy elements with the surface layer part. In such a case, the "chemical composition of the sheet thickness center part" below means the chemical composition measured near the sheet thickness ½ position. Further, in the following explanation, the "%" of the units of contents of the elements, unless otherwise indicated, shall mean "mass %". Furthermore, in this Description, "to" showing a numerical range, unless otherwise indicated, is used in the sense including the numerical values described before and after it as the upper limit value and lower limit value.

(C: 0.050 to 0.800%)

C is an element effective for raising the strength of steel sheet. Further, C is an element effective for securing hardenability. To sufficiently obtain these effects, the content of C is preferably 0.050% or more. The content of C may also be 0.100% or more, 0.200% or more, or 0.250% or more. On the other hand, if excessively containing C, sometimes the toughness falls. Therefore, the content of C is preferably 0.800% or less. The content of C may also be 0.700% or less, 0.600% or less, 0.500% or less, or 0.400% or less.

(Si: 0.01 to 3.00%)

Si is an element effective for securing hardenability. Further, Si is an element suppressing the alloying with Al. To sufficiently obtain these effects, the content of Si is preferably 0.01% or more. Further, from the viewpoint of securing ductility, the content of Si may also be 0.30% or more or 0.50% or more. In addition, Si is also an element effective for suppressing coarsening of iron-based carbides at the sheet thickness center part and for raising the strength and formability. Further, Si is also an element contributing to higher strength of the steel sheet by solution strengthening. From these viewpoints, the content of Si may also be 1.00% or more or 1.20% or more. However, if excessively containing Si, sometimes the sheet thickness center part will become brittle and the ductility will deteriorate. For this reason, the content of Si is preferably 3.00%. The content of Si may also be 2.50% or less, 2.20% or less, or 2.00% or less.

(Mn: 0.01 to 10.00%)

Mn is an element effective for raising the strength of steel sheet. Further, Mn is an element effective for securing hardenability. To sufficiently obtain these effects, the content of Mn is preferably 0.01% or more. The content of Mn may also be 0.10% or more, 1.00% or more, or 1.50% or more. On the other hand, if excessively containing Mn, sometimes the hardness distribution of the steel sheet surface layer becomes larger due to Mn segregation. Therefore, the content of Mn is preferably 10.00% or less. The content of Mn may also be 8.00% or less, 6.00% or less, 5.00% or less, or 4.00% or less.

(Al: 0.001 to 0.500%)

Al is an element acting as a deoxidizer. To sufficiently obtain such an effect, the content of Al is preferably 0.001% or more. The content of Al may also be 0.005% or more, 0.010% or more, or 0.020% or more. On the other hand, if excessively containing Al, coarse oxides are formed and the workability and other characteristics are liable to deteriorate. Therefore, the content of Al is preferably 0.500% or less. The content of Al may also be 0.400% or less, 0.300% or less, 0.200% or less, or 0.100% or less.

(P: 0.100% or less)

P tends to segregate at the sheet thickness center part of steel sheet and, if contained in excess, sometimes causes embrittlement of the weld zone. Therefore, the content of P is preferably 0.100% or less. The content of P may also be 0.080% or less, 0.060% or less, or 0.050% or less. The lower limit of P is not particularly set and may also be 0%, but from the viewpoint of production costs, the content of P may also be more than 0%, 0.001% or more, or 0.005% or more.

(S: 0.050% or Less)

S is an element mixed in at the production process and forming inclusions. If excessively containing S, the toughness and other characteristics are liable to deteriorate. Therefore, the content of S is preferably 0.050% or less. The content of S may also be 0.030% or less, 0.010% or less, or 0.005% or less. The lower limit of S is not particularly set and may also be 0%, but from the viewpoint of production costs, the content of S may also be more than 0%, 0.0001% or more, or 0.0005% or more.

(N: 0.010% or Less)

N, if contained in excess, forms coarse nitrides and sometimes causes the bendability to deteriorate. Therefore, the content of N is preferably 0.010% or less. In addition, N is preferably small in amount since it sometimes becomes a cause of formation of blowholes at the time of welding. For this reason, the content of N may also be 0.008% or less, 0.006% or less, or 0.003% or less. The lower limit of N is not particularly set and may also be 0%, but from the viewpoint of production costs, the content of N may also be more than 0%, 0.0005% or more, or 0.001% or more.

The basic chemical composition of the sheet thickness center part according to this embodiment of the present invention is as explained above. Furthermore, the sheet thickness center part may, in accordance with need, also contain at least one element from among the following optional selective elements in place of part of the Fe of the balance. For example, the sheet thickness center part may also contain at least one element selected from the group comprising Cr: 0 to 3.000%, Mo: 0 to 1.000%, and B: 0 to 0.0100%. Further, the sheet thickness center part may also contain at least one element selected from the group comprising Ti: 0 to 0.500%, Nb: 0 to 0.500%, and V: 0 to 0.500%. Further, the sheet thickness center part may also contain at least one element selected from the group comprising Cu: 0 to 0.50%, Ni: 0 to 0.50%, O: 0 to 0.020%, W: 0 to 0.100%, Ta: 0 to 0.10%, Co: 0 to 0.50%, Sn: 0 to 0.050%, Sb: 0 to 0.050%, As: 0 to 0.050%, Mg: 0 to 0.050%, Ca: 0 to 0.050%, Y: 0 to 0.050%, Zr: 0 to 0.050%, La: 0 to 0.050%, and Ce: 0 to 0.050%. Below, these optional selective elements will be explained in detail.

(Cr: 0 to 3.000%)

Cr is an element contributing to improvement of strength. Further, Cr is an element improving the hardenability. The content of Cr may be 0%, but to sufficiently obtain these effects, the content of Cr is preferably 0.001% or more. The content of Cr may also be 0.005% or more, 0.010% or more, or 0.100% or more. On the other hand, if excessively containing Cr, the pickling ability, weldability, and/or hot workability, etc., will sometimes deteriorate. For this reason, the content of Cr is preferably 3.000% or less. The content of Cr may also be 2.500% or less, 2.000% or less, or 1.000% or less.

(Mo: 0 to 1.000%)

Mo is an element contributing to improvement of the strength. Further, Mo is an element improving the hardenability. The Mo content may also be 0%, but to sufficiently obtain these effects, the Mo content is preferably 0.001% or more. The Mo content may also be 0.005% or more, 0.010% or more, or 0.050% or more. On the other hand, if excessively including Mo, sometimes the pickling ability, weldability, and/or hot workability, etc., deteriorate. For this reason, the Mo content is preferably 1.000% or less. The Mo content may also be 0.800% or less, 0.600% or less, or 0.400% or less.

(B: 0 to 0.0100%)

B is an element contributing to improvement of strength. Further, B is an element improving the hardenability. The content of B may be 0%, but to sufficiently obtain these effects, the content of B is preferably 0.0001% or more. The content of B may also be 0.0010% or more, 0.0020% or more or 0.0030% or more. On the other hand, if excessively containing B, the pickling ability, weldability, and/or hot workability, etc., will sometimes deteriorate. For this reason, the content of B is preferably 0.0100% or less. The content of B may also be 0.0080% or less, 0.0060% or less, or 0.0050% or less.

(Ti: 0 to 0.500%, Nb: 0 to 0.500%, and V: 0 to 0.500%)

Ti, Nb, and V are strengthening elements and improve the strength through formation of carbides. Further, Ti, Nb, and V are elements contributing to refinement by the pinning effect and are also elements lowering the rate of diffusion of Fe due to their presence in a solid solution state. The contents of Ti, Nb, and V may be 0%, but to sufficiently obtain these effects, the contents of Ti, Nb, and V are preferably 0.001% or more. The contents of Ti, Nb, and V may also be 0.005% or more, 0.010% or more, or 0.100% or more. On the other hand, if excessively containing Ti, Nb, and V, sometimes carbides coarsen and cause the formability and other characteristics to deteriorate. Therefore, the contents of Ti, Nb, and V are preferably 0.500% or less. The contents of Ti, Nb, and V may also be 0.400% or less, 0.300% or less, or 0.200% or less.

(Cu: 0 to 0.50% and Ni: 0 to 0.50%)

Cu and Ni are elements contributing to improvement of strength. The contents of Cu and Ni may be 0%, but to sufficiently obtain such an effect, the contents of Cu and Ni are preferably 0.001% or more. The contents of Cu and Ni may also be 0.005% or more, 0.01% or more, or 0.10% or more. On the other hand, if excessively containing Cu and Ni, the pickling ability, weldability, and/or hot workability, etc., will sometimes deteriorate. For this reason, the contents of Cu and Ni are preferably 0.50% or less. The contents of Cu and Ni may also be 0.40% or less, 0.30% or less, or 0.20% or less.

(Others)

Furthermore, the sheet thickness center part may intentionally or unavoidably contain the following elements. The effects of the present invention are not obstructed by the same. These elements are O: 0 to 0.020%, W: 0 to 0.100%, Ta: 0 to 0.10%, Co: 0 to 0.50%, Sn: 0 to 0.050%, Sb: 0 to 0.050%, As: 0 to 0.050%, Mg: 0 to 0.050%, Ca: 0 to 0.050%, Zr: 0 to 0.050%, and Y: 0 to 0.050%, La: 0 to 0.050%, Ce: 0 to 0.050%, and other REM (rare earth metals). The contents of these elements may also be 0.0001% or more or 0.001% or more.

At the sheet thickness center part according to this embodiment of the present invention, the balance other than the above elements is comprised of Fe and impurities. "Impurities" are constituents, etc., mixed in due to various factors of the production process, first and foremost raw materials such as ore and scrap, etc., when industrially producing steel sheet or the sheet thickness center part.

(Preferable Chemical Composition of First Surface Layer Softened Part and Second Surface Layer Softened Part)

In one embodiment of the present invention, the first surface layer softened part and second surface layer softened part have average Vickers hardnesses of 0.90 time or less of the average Vickers hardness of the sheet thickness ½ position. The average Vickers hardness of the first surface layer softened part should be 1.05 times or more of the average Vickers hardness of the second surface layer softened part. For this reason, the chemical compositions of the first surface layer softened part and second surface layer softened part are not particularly limited. For example, if forming the first surface layer softened part and second surface layer softened part by decarburizing a single-layer steel sheet to soften the surface layer parts, the chemical compositions of these basically are equal to the chemical composition of the sheet thickness center part except for the carbon concentration near the surface becoming lower.

On the other hand, if producing steel sheet according to one embodiment of the present invention not by a single-layer steel sheet, but multi-layer steel sheet, more specifically if utilizing the cladding method, etc., to stack two surface layer-use steel materials for forming the first surface layer softened part and second surface layer softened part on the two sides of a base steel material for forming the sheet thickness center part, it is also possible to change the contents of at least one selected from the group consisting of specific alloy elements of the first surface layer softened part and second surface layer softened part relating to the steel sheet strength, for example C, Mn, Cr, Mo, B, Cu, Ni, etc., relative to the chemical composition of the sheet thickness center part. More specifically, to make the average Vickers hardnesses of the first surface layer softened part and the second surface layer softened part 0.90 time or less of the average Vickers hardness of the sheet thickness ½ position, the contents of C of the first surface layer softened part and second surface layer softened part are preferably 0.9 time or less the content of C of the sheet thickness center part and may also be 0.7 time or less, 0.5 time or less, or 0.3 time or less of the same. Instead of this or in addition to this, the sum of the contents of Mn, Cr, and Mo, the content of B, and/or the sum of the contents of Cu and Ni of the first surface layer softened part and second surface layer softened part is preferably 0.9 time or less of the contents of elements or sum of the contents of elements of the respectively corresponding sheet thickness center part and may also be 0.7 time or less, 0.5 time or less, or 0.3 time or less of the same. The contents of the other elements are not particularly limited and, for example, may also be contents similar to the case of the sheet thickness center part.

(Tensile Strength)

The steel sheet according to one embodiment of the present invention can have any suitable tensile strength. While not particularly limited, for example, preferably it has a tensile strength of 980 MPa or more. High strength steel is particularly susceptible to hydrogen embrittlement. Further, when shearing high strength steel sheet, compared with the case of steel sheet having a relatively low tensile strength, the tensile residual stress occurring at the sheared edge generally becomes greater. Therefore, if the steel sheet according to one embodiment of the present invention has a 980 MPa or more high tensile strength, compared with the case of shearing conventional steel sheet having the same tensile strength, the effect of reduction of the tensile residual stress occurring at the sheared edge is remarkable. Accordingly, the improvement of the hydrogen embrittlement reaction becomes particularly remarkable. Furthermore, even when having a tensile strength greatly over 980 MPa, the steel sheet according to one embodiment of the present invention can sufficiently reduce the tensile residual stress occurring at the sheared edge at the time of shearing compared with shearing conventional steel sheet having the same tensile strength. For example, in this embodiment of the present invention, the tensile strength of the steel sheet may be 1080 MPa or more, 1180 MPa or more, 1250 MPa or more, 1300 MPa or more, or 1470 MPa or more. The upper limit is not particularly set, but, for example, the tensile strength of the steel sheet may also be 2500 MPa or less, 2200 MPa or less, or 2000 MPa or less. The tensile strength is measured by obtaining a JIS No. 5 tensile test piece from a direction of the steel sheet perpendicular to the rolling direction and performing a tensile test based on JIS Z2241 (2011).

(Sheet Thickness)

The steel sheet according to one embodiment of the present invention, while not particularly limited, generally has a sheet thickness of 6.0 mm or less, more specifically 0.8 to 6.0 mm. By making the sheet thickness of the steel sheet a 6.0 mm or less or other sheet thickness more suitable for shearing, the effect of reduction of the tensile residual stress occurring at the sheared edge can be made more remarkable. For example, the sheet thickness may be 1.0 mm or more or 2.0 mm or more and/or may be 5.5 mm or less, 5.0 mm or less, 4.5 mm or less, 4.0 mm or less, or 3.0 mm or less.

(Plating)

It is also possible to form a plating layer at least at one surface of the first surface layer softened part and second surface layer softened part of the steel sheet according to one embodiment of the present invention for the purpose of improving the corrosion resistance, etc. The plating layer may be either of an electroplating layer and hot dip coating layer. An electroplating layer includes, for example, an electrogalvanization layer, electro Zn—Ni alloy plating layer, etc. A hot dip coating layer includes, for example, a hot dip galvanization layer, hot dip galvannealing layer, hot dip aluminum coating layer, hot dip Zn—Al alloy coating layer, hot dip Zn—Al—Mg alloy coating layer, hot dip Zn—Al—Mg—Si alloy coating layer, etc. The amount of deposition of the plating layer is not particularly limited and may be a general amount of deposition.

<Method of Production of Steel Sheet>

Next, the preferable method of production of the steel sheet according to one embodiment of the present invention will be explained. The following explanation is intended to illustrate the characteristic method for producing the steel sheet according to one embodiment of the present invention and is not intended to limit the steel sheet to one produced by the method of production such as explained below.

The steel sheet according to one embodiment of the present invention, for example, can be produced by utilizing decarburization to form decarburized layers (first surface layer softened part and second surface layer softened part) on the two sides of a single-layer steel sheet. Steel sheet is generally produced through a plurality of steps such as a casting step, hot rolling and coiling step, pickling step, cold rolling step, annealing step, and, in accordance with need, plating step, etc., but the decarburized layers can be formed utilizing decarburization at, for example, the hot rolling and coiling step and/or the annealing step. Below, the case of forming the decarburized layer mainly at the hot rolling and coiling step and the case of forming the decarburized layer at the annealing step will be explained, but only naturally it is also possible to form a decarburized layer at both steps to thereby form the first and second surface layer softened parts.

(Formation of Decarburized Layer at Hot Rolling and Coiling Step and Formation of First and Second Surface Layer Softened Parts Relating to Same)

Generally, at the hot rolling and coiling step, a cast slab is heated in the air atmosphere or other oxidizing atmosphere to about 1100 to 1350° C. in temperature, then is rough rolled and finish rolled. The obtained hot rolled steel sheet is, for example, coiled at an about 700° C. or less coiling temperature. That is, at the hot rolling and coiling step, the steel material is exposed to the inside of an oxidizing atmosphere at a relatively high temperature, so the carbon near the surface of the hot rolled steel sheet bonds with the oxygen in the atmosphere and is released as $CO_2$ whereby the phenomenon of the carbon concentration near the surface falling (i.e., decarburization) sometimes occurs. In relation to this, the degree of decarburization can be controlled by suitably selecting the temperature at the time of hot rolling, the coiling temperature, and the atmosphere and time, etc., of these operations, therefore it is possible to form decarburized layers having desired average Vickers hardnesses based on such decarburization (surface layer softened parts) on both sides of the steel sheet. In particular, the coiling temperature after the hot rolling is a parameter effective in controlling the degree of decarburization. For example, the coiling temperature can be made 600° C. or more to enable decarburization to be promoted.

Next, the obtained hot rolled steel sheet can be pickled, then, for example, wire-brushing or shot-blasting or other treatment can be applied to only one surface of the hot rolled steel sheet (first surface layer softened part side) so as obtain hot rolled steel sheet with an average thickness of one surface layer softened part smaller than the average thickness of the other surface layer softened part. The decarburized layer has a lower concentration of carbon the closer to the surface, therefore accordingly generally has a hardness distribution where the Vickers hardness becomes lower the closer to the surface. Therefore, by removing part of the surface side of one surface layer softened part by wire-brushing, etc., to make the average thickness smaller than the average thickness of the other surface layer softened part, the surface part having the lower Vickers hardness of the one surface layer softened part is removed and as a result the average Vickers hardness of the one surface layer softened part (first surface layer softened part) can be made higher compared with the average Vickers hardness of the other surface layer softened part (second surface layer softened part).

If utilizing wire-brushing, it is possible to adjust the amount of removal to a desired range by changing the speed (rpm) of the brush. For example, it is possible to make the brush speed of the first surface layer softened part side larger than the second surface layer softened part side so as to make the first surface layer softened part thinner than the second surface layer softened part and, as a result, make the average Vickers hardness of the first surface layer softened part higher than the average Vickers hardness of the second surface layer softened part. Further, compared with shot-blasting, wire-brushing is strong in removal force, therefore from the viewpoint of removing the decarburized layer, it is preferable to utilize wire-brushing.

From the viewpoint of more reliably preferentially growing a crack from the first surface layer softened part side, wire-brushing or shot-blasting or other treatment is preferably performed on the first surface layer softened part side of the hot rolled steel sheet so that the average thickness of the first surface layer softened part becomes preferably ⅘ or less of the average thickness of the second surface layer softened part, more preferably ¾ or less, most preferably ½ or less. The thus obtained hot rolled steel sheet may be made the steel sheet according to one embodiment of the present invention or the hot rolled steel sheet may be then treated at the cold rolling step, annealing step, plating step, etc., and the obtained cold rolled steel sheet or plated steel sheet may be made the steel sheet according to one embodiment of the present invention. The specific conditions of the steps are not particularly limited. Suitable conditions may be suitably selected in accordance with the type of steel, application of the steel sheet, desired characteristics, etc. Regarding the annealing step, if performing it under conditions where no decarburization occurs, for example, it is preferable to perform it at a low dew point (more specifically −30° C. or less or −40° C. or less or other low dew point) in a nonoxidizing atmosphere (more specifically a nitrogen atmosphere containing 1 to 10% of hydrogen). The heating time and holding time at the annealing step can be suitably selected in accordance with the desired strength and microstructure. While not particularly limited, generally they can be selected from the ranges of 750 to 900° C. and 30 to 600 seconds.

When forming a decarburized layer, oxygen diffuses into the steel from the outside atmosphere whereby internal oxides are also typically formed near the surface of the steel sheet. However, the internal oxide layer formed by such internal oxides is generally smaller in thickness compared with a decarburized layer. Therefore, if removing part of the surface side of the first surface layer softened part by wire-brushing, etc., sometimes the internal oxide layer which had been present near the surface of the first surface layer softened part is ground off. In such a case, sometimes only the second surface layer softened part includes an internal oxide layer.

(Formation of Decarburized Layer at Annealing Step and Formation of First and Second Surface Layer Softened Parts Relating to Same)

For example, it is also possible to perform treatment in the previous hot rolling and coiling step under conditions where no decarburization occurs (for example, under conditions of a coiling temperature of less than 600° C.) to obtain a hot rolled steel sheet, then, after the pickling step and cold rolling step, perform decarburization at the annealing step. The speed of the decarburization reaction from the steel sheet surface generally depends on the oxygen potential in the atmosphere, therefore, for example, in the annealing step, it is possible to raise the dew point in the furnace atmosphere to raise the oxygen potential of the furnace atmosphere and thereby promote the decarburization reaction from the steel sheet surface. The oxygen potential is generally expressed by the log ($P_{H2O}/P_{H2}$) of the value of the water vapor partial pressure $P_{H2O}$ in the annealing furnace divided by the hydrogen partial pressure $P_{H2}$. For this reason, if performing decarburization, it is necessary to suitably control the dew point in the annealing furnace and the hydrogen partial pressure, but if performing annealing in a nitrogen atmosphere including 1 to 10% of hydrogen, generally it becomes possible to treat for decarburization by controlling the dew point to −20° C. or more. By controlling the dew point to 0° C. or more, it is possible to promote a decarburization reaction.

In relation to this, for example, before the above annealing step, it is also possible to apply wire-brushing or shot-blasting or other treatment to only the surface of the cold rolled steel sheet on the second surface layer softened part side. By performing treatment by shot-blasting, etc., it is possible to raise the surface roughness of the second surface layer softened part side of the cold rolled steel sheet and therefore it is possible to increase the area of the second surface layer softened part side compared with the area of the first surface layer softened part side. In this case, in the later annealing step, it is possible to promote the decarburization reaction of the surface of the cold rolled steel sheet on the second surface layer softened part side. As a result, it is possible to obtain a cold rolled steel sheet where the average thickness of the first surface layer softened part is smaller than the average thickness of the second surface layer softened part. In this case, in the first surface layer softened part, the average thickness from the position where the average thickness becomes 0.90 time or less of the average Vickers hardness of the sheet thickness ½ position to the surface is smaller than the average thickness of the second surface layer softened part, and the average thickness of these has a hardness distribution where the Vickers hardness becomes lower the closer to the surface, therefore as a result, the average Vickers hardness of the first surface layer softened part is made higher compared with the average Vickers hardness of the second surface layer softened part.

Alternatively, further, before the above annealing step, it is also possible to perform wire-brushing or shot-blasting or other treatment on both sides of the cold rolled steel sheet and change the extent of the treatment at the two sides of the cold rolled steel sheet. In this case, at the two sides of the cold rolled steel sheet, a difference arises in the surface roughness, therefore at the higher surface roughness side (second surface layer softened part side), due to the higher surface area, a decarburization reaction is promoted at the annealing step after the same. As a result, similarly, it is possible to obtain a cold rolled steel sheet where the average thickness of the first surface layer softened part is smaller than the average thickness of the second surface layer softened part, i.e., it is possible to make the average Vickers hardness of the first surface layer softened part higher than the average Vickers hardness of the second surface layer softened part.

If utilizing shot-blasting, by changing the flow rate of the blasting material (kg/min·mm$^2$), etc., it is possible to adjust the surface roughness to the desired range. For example, by making the flow rate of the blasting material of the first surface layer softened part side smaller than the second surface layer softened part side, it is possible to raise the surface roughness of the second surface layer softened part side and promote the decarburization reaction at the second surface layer softened part side and, as a result, possible to make the first surface layer softened part thinner than the second surface layer softened part and make the average Vickers hardness of the first surface layer softened part higher than the average Vickers hardness of the second surface layer softened part.

As explained above, when forming a decarburized layer, internal oxides are typically also formed near the surface of the steel sheet, so naturally internal oxidation is also promoted under conditions where a decarburization reaction is promoted. Therefore, for example, as explained above, if coiling the hot rolled steel sheet at a 600° C. or more high temperature after the hot rolling and performing the annealing step in a −20° C. or more or 0° C. or more furnace atmosphere of a relatively high oxygen potential, compared with the case where such high temperature coiling and annealing under a high oxygen potential are not performed or only one among these is performed, the degree of internal oxidation at the steel sheet, for example, the above explained emission intensity ratio $I_{max}/I_{ave}$, tends to become higher. Further, in addition to this, if performing wire-brushing or shot-blasting or other treatment before the annealing step, the decarburization reaction is further promoted, so the emission intensity ratio $I_{max}/I_{ave}$ also becomes further higher corresponding to this.

(Method of Production Utilizing Cladding Method)

Aside from utilizing decarburization, the steel sheet according to one embodiment of the present invention can be produced by any suitable method known to persons skilled in the art. While not particularly limited, for example, the steel sheet according to one embodiment of the present invention can be produced utilizing the cladding method. In this case, the method of production of the steel sheet may further include a stacking step for stacking two surface-layer use steel materials for forming a first surface layer softened part and second surface layer softened part at the two sides of a base steel material for forming the sheet thickness center part so as to form a multi-layer steel material, a hot rolling step for hot rolling the obtained stacked steel materials, and a cooling step for cooling the hot rolled multi-layer steel material and, in accordance with need, a coiling step, cold rolling step, annealing step, plating step, etc.

In the stacking step, for example, it is possible to form a multi-layer steel material by stacking two surface-layer use steel materials for forming the first surface layer softened part and second surface layer softened part having chemical compositions explained above on the two sides of a base material steel sheet for forming the sheet thickness center part having the chemical composition explained above and degreased on its surface and joining them by arc welding, etc. At that time, it is also possible to change the contents of some of the elements of the chemical composition between the two surface-layer use steel materials (for example, in particular the contents of at least one element such as C, Mn, Cr, Mo, B, Cu, Ni, etc. relating to the steel sheet strength) so that the average Vickers hardness of the first surface layer softened part of the finally obtained steel sheet becomes higher than the average Vickers hardness of the second surface layer softened part.

At the hot rolling step, first the multi-layer steel material generally is heated to a 1100 to 1350° C. temperature, next the hot rolling is performed under conditions giving a completion temperature of hot rolling of 800° C. or more. If the completion temperature of hot rolling is too low, the rolling reaction force becomes higher and it becomes difficult to stably obtain the desired sheet thickness. Aside from this, the specific conditions of the steps are not particularly limited. Suitable conditions may be suitably selected in accordance with the type of steel, application of the steel sheet, desired characteristics, etc. For example, to form low temperature transformed structures in the base steel material to obtain high strength steel sheet, the coiling temperature at the coiling step may be made a relatively low temperature, more specifically 600° C. or less, in particular 400° C. or less.

The steel sheet according to one embodiment of the present invention, as explained above, is excellent in the effect of reduction of the tensile residual stress occurring at the sheared edge at the time of shearing and therefore is suitable for application to shearing (i.e., used as steel sheet for shearing use). In shearing, generally it is preferable to perform cutting while placing the first surface layer softened part of the steel sheet at the punch side and the second surface layer softened part of the steel sheet at the die side. Due to this, it is possible to reduce the tensile residual stress occurring at the sheared edge of the targeted workpiece by the crack growing from the first surface layer softened part of the punch side and as a result to remarkably improve the hydrogen embrittlement resistance of the sheared edge at the workpiece. On the other hand, if performing cutting while placing the first surface layer softened part of the steel sheet at the die side and the second surface layer softened part of the steel sheet at the punch side, it is possible to reduce the tensile residual stress occurring at the sheared edge of the scrap by the crack growing from the first surface layer softened part of the die side. Therefore, in such a case, it is possible to utilize the obtained scrap for some sort of product.

Below, examples will be used to explain the present invention in more detail, but the present invention is not limited to these examples in any way.

EXAMPLES

In this example, first, a continuously cast slab of a sheet thickness of 20 mm having the chemical composition shown in Table 1 was heated to a predetermined temperature of 1100 to 1350° C. in range and was hot rolled under conditions giving a completion temperature of hot rolling of 800° C. or more, then the sheet was coiled at the coiling temperature shown in Table 2 and was further pickled to obtain hot rolled steel sheet of a sheet thickness of about 2.4 mm. Next, in accordance with need, one or both of the first and second surface layer softened part sides of the hot rolled steel sheet were wire-brushed by a brush speed shown in Table 2, then were cold rolled. Next, in accordance with need, one or both of the first and second surface layer softened part sides of the steel sheet were shot-blasted by the flow rate of the blasting material shown in Table 2 and, finally, annealing was performed under the conditions shown in Table 2 to obtain the cold rolled steel sheet of the product. A sample taken from the obtained cold rolled steel sheet was analyzed for the chemical composition of the part corresponding to the sheet thickness center part, whereupon there was substantially no change from the chemical composition shown in Table 1.

TABLE 1

| Constituent | Sheet thickness center part (mass %, balance: Fe and impurities) | | | | | | | | | | | | | |
| --- | --- | --- | --- | --- | --- | --- | --- | --- | --- | --- | --- | --- | --- | --- |
| | C | Si | Mn | Al | P | S | N | Cr | Mo | B | Ti | Nb | V | Cu |
| a | 0.200 | 0.50 | 2.60 | 0.020 | 0.010 | 0.002 | 0.010 | — | — | — | — | — | — | — |
| b | 0.250 | 0.10 | 3.00 | 0.020 | 0.010 | 0.002 | 0.010 | — | — | — | — | — | — | — |
| c | 0.300 | 1.00 | 2.50 | 0.020 | 0.010 | 0.002 | 0.010 | 0.300 | 0.100 | 0.0020 | — | — | — | — |
| d | 0.250 | 0.10 | 2.80 | 0.020 | 0.010 | 0.002 | 0.010 | — | — | — | 0.020 | 0.020 | 0.100 | — |
| e | 0.250 | 0.60 | 2.70 | 0.020 | 0.010 | 0.002 | 0.010 | — | — | 0.0020 | 0.020 | — | — | — |
| f | 0.250 | 0.60 | 2.80 | 0.020 | 0.010 | 0.002 | 0.010 | — | — | — | — | — | — | — |
| g | 0.250 | 0.20 | 2.80 | 0.020 | 0.010 | 0.002 | 0.010 | — | — | — | — | — | — | 0.10 |
| h | 0.250 | 0.10 | 1.80 | 0.020 | 0.010 | 0.002 | 0.010 | — | — | — | — | — | — | — |
| i | 0.050 | 0.50 | 2.60 | 0.020 | 0.010 | 0.002 | 0.010 | — | — | — | — | — | — | — |
| j | 0.120 | 0.60 | 2.70 | 0.020 | 0.010 | 0.002 | 0.010 | — | — | 0.0020 | 0.030 | — | — | — |
| k | 0.080 | 0.50 | 2.60 | 0.020 | 0.010 | 0.002 | 0.010 | — | 0.050 | — | — | 0.020 | — | — |

| Constituent | Sheet thickness center part (mass %, balance: Fe and impurities) | | | | | | | | | | | | | |
| --- | --- | --- | --- | --- | --- | --- | --- | --- | --- | --- | --- | --- | --- | --- |
| | Ni | O | W | Ta | Co | Sn | Sb | As | Mg | Ca | Y | Zr | La | Ce |
| a | — | — | — | — | — | — | — | — | — | — | — | — | — | — |
| b | — | 0.001 | — | — | — | — | — | — | — | — | — | — | — | — |
| c | — | 0.001 | — | — | — | — | — | — | — | — | — | — | — | — |
| d | — | 0.001 | — | — | — | — | — | — | — | 0.010 | — | — | — | — |
| e | 0.10 | 0.001 | 0.050 | — | — | — | — | — | — | — | 0.010 | — | — | — |
| f | — | 0.001 | — | 0.01 | 0.02 | — | — | — | — | — | — | — | — | 0.020 |
| g | — | 0.001 | — | — | — | 0.020 | — | 0.010 | 0.010 | — | — | — | 0.010 | — |
| h | — | 0.001 | — | — | — | — | 0.010 | — | — | 0.002 | — | — | — | — |
| i | — | — | — | — | — | — | — | — | — | — | — | — | — | — |
| j | — | — | — | — | — | — | — | — | — | — | — | — | — | — |
| k | — | — | — | — | — | — | — | — | — | — | — | — | — | — |

TABLE 2

| | | Wire-brushing before cold rolling | | Shot-blasting after cold rolling | | Annealing | | | |
| --- | --- | --- | --- | --- | --- | --- | --- | --- | --- |
| | | | | First surface | Second surface | | | | |
| Production condition | Hot rolling and coiling Coiling temperature (° C.) | First surface layer softened part side brush speed (rpm) | Second surface layer softened part side brush speed (rpm) | layer softened part side blasting material flow rate (kg/min · mm$^2$) | layer softened part side blasting material flow rate (kg/min · mm$^2$) | Dew point (° C.) | Hydrogen concentration (N$_2$ balance) (%) | Heating temperature (° C.) | Holding time (s) |
| 1 | 650 | 2000 | 1000 | — | — | −40 | 3 | 850 | 300 |
| 2 | 650 | 2000 | — | — | — | −20 | 3 | 850 | 100 |
| 3 | 650 | 2000 | 2000 | — | 0.5 | 0 | 5 | 850 | 300 |
| 4 | 650 | 2000 | 1000 | 0.2 | 0.8 | 0 | 5 | 850 | 300 |
| 5 | 650 | — | — | — | 0.5 | 0 | 3 | 850 | 300 |
| 6 | 650 | — | — | 0.2 | 0.5 | 0 | 10 | 850 | 300 |
| 7 | 550 | — | — | 0.2 | 0.5 | 0 | 3 | 850 | 300 |
| 8 | 550 | — | — | 0.5 | — | 10 | 3 | 850 | 300 |
| 9 | 650 | 2000 | 2000 | — | 0.5 | 0 | 5 | 850 | 300 |
| 10 | 650 | 2000 | 2000 | — | — | −40 | 3 | 850 | 300 |
| 11 | 650 | — | — | — | — | −40 | 3 | 850 | 300 |
| 12 | 550 | — | — | 0.2 | 0.5 | −40 | 3 | 850 | 300 |

TABLE 2-continued

| | | Wire-brushing before cold rolling | | Shot-blasting after cold rolling | | | | | |
| | | | | First surface | Second surface | | | | |
| | | First surface layer | Second surface layer | layer softened part side | layer softened part side | Annealing | | | |
| Production condition | Hot rolling and coiling Coiling temperature (°C.) | softened part side brush speed (rpm) | softened part side brush speed (rpm) | blasting material flow rate (kg/min · mm²) | blasting material flow rate (kg/min · mm²) | Dew point (°C.) | Hydrogen concentration (N₂ balance) (%) | Heating temperature (°C.) | Holding time (s) |
|---|---|---|---|---|---|---|---|---|---|
| 13 | 550 | — | — | 0.2 | 0.5 | 0 | 3 | 780 | 300 |
| 14 | 550 | — | — | — | — | −40 | 3 | 850 | 300 |
| 15 | 550 | — | — | — | 0.5 | 0 | 3 | 800 | 150 |

The characteristics of the obtained cold rolled steel sheet were measured and evaluated by the following methods:

[Average Vickers Hardness of Sheet Thickness ½ Position and Average Thicknesses of First and Second Surface Layer Softened Parts]

The average thicknesses of the first surface layer softened part and second surface layer softened part were determined as follows: First, the Vickers hardness at the sheet thickness direction position was measured by a pressing load of 100 g in the sheet thickness direction from the sheet thickness ½ position of the steel sheet toward the surface of the first surface layer softened part side at intervals of 5% of the sheet thickness, next the Vickers hardnesses of a total of 5 points were measured in a direction vertical to the sheet thickness at that position and on a line parallel to the rolling direction similarly by a press load of 100 g and the average value of these was made the average Vickers hardness at that sheet thickness direction position. The interval of the measurement points aligned in the sheet thickness direction and the rolling direction was made a distance of 4 times or more of the indentations. If difficult to make the intervals of the measurement points a distance of 4 times or more of the indentations while striking the surface in the sheet thickness direction in a line, the intervals of the measurement points were made a distance of 4 times or more of the indentations and the surface was struck in the sheet thickness direction in a zigzag pattern. When the average Vickers hardness at a certain sheet thickness direction position becomes 0.90 time or less of the similarly measured average Vickers hardness at the sheet thickness ½ position, the surface side from that position is defined as the first surface layer softened part. The average thickness of the first surface layer softened part (μm) was determined. The second surface layer softened part as well is measured in the same way as the first surface layer softened part so as to determine the average thickness of the second surface layer softened part.

[Average Vickers Hardness of First Surface Layer Softened Part and Second Surface Layer Softened Part]

The average Vickers hardnesses of the first surface layer softened part and second surface layer softened part were determined by measuring the Vickers hardnesses of 10 points at random in the first surface layer softened part and second surface layer softened part defined as explained above by press loads of 100 g and calculating the average values of these.

[Presence of Internal Oxide Layers]

The presence of any internal oxide layers was judged by measuring the polished surfaces of steel sheet cross-section by a 1000× or more power by an SEM-EDX and determining if granular oxides including Si, Mn, and/or Al were observed.

[Measurement of Emission Intensity Ratio $I_{max}/I_{ave}$ by High Frequency GDS]

The emission intensity ratio $I_{max}/I_{ave}$ was measured by high frequency GDS by rendering the steel sheet surface an argon atmosphere, applying voltage to create glow plasma, and in that state sputtering the steel sheet surface while analyzing the composition in the depth direction. Standard samples were used to find the relationship between the sputter time and sputter depth in advance and the sputter depth converted from the sputter time was defined as the depth from the steel sheet surface. Based on the depth from the steel sheet surface defined in the above way, the emission intensity ratio $I_{max}/I_{ave}$ was determined from the maximum emission intensity $I_{max}$ derived from the Si oxides at the depth region of more than 0.2 μm and 10.0 μm or less from the steel sheet surface measured by high frequency GDS and the average value Iave of similarly the emission intensity in the depth region of 10.0 μm or more and 15.0 μm or less from the steel sheet surface.

[Tensile Strength]

The tensile strength was measured by obtaining a JIS No. 5 tensile test piece from a direction perpendicular to the rolling direction of the cold rolled steel sheet and subjecting it to a tensile test based on JIS Z2241 (2011).

[Tensile Residual Stress]

Cold rolled steel sheet was sheared and the tensile residual stress occurring at the sheared edge of the cold rolled steel sheet was measured. Specifically, the first surface layer softened part of the cold rolled steel sheet is arranged at the punch side and the second surface layer softened part of the cold rolled steel sheet at the die side and the punch and the die are made to relatively move to punch the cold rolled steel sheet by the punch and obtain a workpiece having a sheared edge on the die. Next, at the center position of the workpiece in the sheet thickness direction (corresponding to fracture surface), the residual stress was measured by X-rays by a spot diameter of φ500 μm (three different locations in the sheet width direction). The measurement directions of the residual stress were made the three directions of the sheet thickness direction, sheet width direction, and the direction of 45 degrees from the sheet thickness. The $\sin^2\psi$ method was used for calculation of the residual stress. The residual stress in the end face normal direction was assumed to be zero and the maximum main stress was calculated from the residual stress in three directions calculated. The tensile residual stress of each workpiece was determined by averaging the values of the maximum main stresses calculated at three locations. The case where the ratio of the tensile residual stress and the tensile strength (tensile residual stress/tensile strength) was 0.90 or less was evaluated as steel sheet able to reduce the tensile residual stress occurring at the sheared edge at the time of shearing. The obtained results are shown in Table 3.

softened part at the punch side preferentially crack. As a result, it was not possible to sufficiently reduce the tensile residual stress occurring at the sheared edge of the workpiece. In each of Comparative Examples 12 and 14, decarburization did not sufficiently occur at the hot rolling and coiling step and the annealing step, therefore it was not possible to form the surface layer softened parts at both sides of the steel sheet. As a result, it was not possible to sufficiently reduce the tensile residual stress occurring at the sheared edge of the workpiece.

TABLE 3

| Example no. | Steel type | Production conditions | Average thickness (μm) A First surface layer softened parts | Average thickness (μm) B Second surface layer softened parts | A/B | Average Vickers hardness (Hv) C Sheet thickness 1/2 position | Average Vickers hardness (Hv) D First surface layer softened parts | Average Vickers hardness (Hv) E Second surface layer softened parts | D/C | E/C | D/E |
|---|---|---|---|---|---|---|---|---|---|---|---|
| 1 | a | 1 | 40 | 60 | 0.7 | 505 | 423 | 371 | 0.84 | 0.73 | 1.14 |
| 2 | b | 2 | 40 | 80 | 0.5 | 553 | 412 | 360 | 0.75 | 0.65 | 1.14 |
| 3 | c | 3 | 120 | 140 | 0.9 | 604 | 322 | 264 | 0.53 | 0.44 | 1.22 |
| 4 | d | 4 | 120 | 250 | 0.5 | 548 | 354 | 161 | 0.65 | 0.29 | 2.20 |
| 5 | e | 5 | 160 | 180 | 0.9 | 553 | 271 | 220 | 0.49 | 0.40 | 1.23 |
| 6 | f | 6 | 170 | 180 | 0.9 | 550 | 254 | 225 | 0.46 | 0.41 | 1.13 |
| 7 | g | 7 | 70 | 80 | 0.9 | 551 | 351 | 322 | 0.64 | 0.58 | 1.09 |
| 8 | h | 8 | 100 | 120 | 0.8 | 549 | 350 | 307 | 0.64 | 0.56 | 1.14 |
| 9 | a | 9 | 120 | 140 | 0.9 | 506 | 273 | 222 | 0.54 | 0.44 | 1.23 |
| 10 | a | 10 | 40 | 40 | 1.0 | 510 | 375 | 371 | 0.74 | 0.73 | 1.01 |
| 11 | a | 11 | 80 | 80 | 1.0 | 547 | 351 | 348 | 0.64 | 0.64 | 1.01 |
| 12 | a | 12 | 0 | 0 | 0.0 | 502 | — | — | — | — | — |
| 13 | a | 13 | 70 | 80 | 0.9 | 547 | 302 | 273 | 0.55 | 0.50 | 1.11 |
| 14 | a | 14 | 0 | 0 | 0.0 | 505 | — | — | — | — | — |
| 15 | i | 1 | 50 | 60 | 0.8 | 254 | 221 | 203 | 0.87 | 0.80 | 1.09 |
| 16 | j | 15 | 100 | 120 | 0.8 | 403 | 250 | 230 | 0.62 | 0.57 | 1.09 |
| 17 | k | 15 | 100 | 130 | 0.8 | 312 | 220 | 188 | 0.71 | 0.60 | 1.17 |

| Example no. | Internal oxide layer First surface layer softened parts | Internal oxide layer Second surface layer softened parts | Emission intensity ratio $I_{max}/I_{ave}$ First surface layer softened parts | Emission intensity ratio $I_{max}/I_{ave}$ Second surface layer softened parts | Sheet thickness (mm) | F Tensile strength (MPa) | G Tensile residual stress (MPa) | G/F | Remarks |
|---|---|---|---|---|---|---|---|---|---|
| 1 | No | No | 1.1 | 1.1 | 1.4 | 1510 | 1183 | 0.78 | Inv. ex. |
| 2 | Yes | Yes | 1.5 | 1.6 | 1.5 | 1620 | 1250 | 0.77 | Inv. ex. |
| 3 | Yes | Yes | 1.5 | 1.8 | 1.2 | 1770 | 1200 | 0.68 | Inv. ex. |
| 4 | Yes | Yes | 1.7 | 2.0 | 1.3 | 1630 | 1081 | 0.66 | Inv. ex. |
| 5 | Yes | Yes | 1.8 | 2.1 | 1.6 | 1640 | 1224 | 0.75 | Inv. ex. |
| 6 | Yes | Yes | 2.0 | 2.3 | 1.6 | 1650 | 1290 | 0.78 | Inv. ex. |
| 7 | Yes | Yes | 1.6 | 1.7 | 1.0 | 1660 | 1210 | 0.73 | Inv. ex. |
| 8 | Yes | Yes | 1.5 | 1.7 | 1.5 | 1630 | 1262 | 0.77 | Inv. ex. |
| 9 | Yes | Yes | 1.5 | 1.7 | 1.2 | 1500 | 1120 | 0.75 | Inv. ex. |
| 10 | No | No | 1.1 | 1.2 | 1.4 | 1480 | 1406 | 0.95 | Comp. ex. |
| 11 | Yes | Yes | 1.7 | 1.7 | 1.4 | 1530 | 1461 | 0.96 | Comp. ex. |
| 12 | No | No | 1.1 | 1.2 | 1.4 | 1520 | 1500 | 0.99 | Comp. ex. |
| 13 | Yes | Yes | 1.5 | 1.6 | 1.4 | 650 | 520 | 0.80 | Inv. ex. |
| 14 | No | No | 1.1 | 1.1 | 1.4 | 1570 | 1540 | 0.98 | Comp. ex. |
| 15 | No | No | 1.1 | 1.2 | 1.4 | 780 | 635 | 0.81 | Inv. ex. |
| 16 | Yes | Yes | 1.6 | 1.6 | 1.4 | 1215 | 995 | 0.82 | Inv. ex. |
| 17 | Yes | Yes | 1.5 | 1.6 | 1.4 | 1006 | 764 | 0.76 | Inv. ex. |

Referring to Table 3, in each of Comparative Examples 10 and 11, the average Vickers hardness of the first surface layer softened part was less than 1.05 times the average Vickers hardness of the second surface layer softened part, therefore it was not possible to make the first surface layer In contrast to this, in each of Invention Examples 1 to 9, 13, and 15 to 17, by controlling the average Vickers hardness of the first surface layer softened part to become 1.05 times or more of the average Vickers hardness of the second surface layer softened part, it was possible to make the first surface layer softened part at the punch side preferentially crack and as a result was possible to remarkably reduce the tensile residual stress occurring at the sheared edge of the workpiece.

REFERENCE SIGNS LIST 1 sheared edge
1a droop
1b fracture surface
1bx first part
1by second part
1c burr
1dx first crack
1dy second crack
1e sheared surface
5 steel sheet
10 workpiece
10a first surface
10b second surface
11 one part of steel sheet
12 other part of steel sheet
15 scrap
21 first blade
22 second blade

The invention claimed is:

1. A steel sheet comprising a sheet thickness center part and a first surface layer softened part and a second surface layer softened part respectively arranged at two sides of the sheet thickness center part, wherein
the first surface layer softened part and second surface layer softened part have 10 μm or more average thicknesses and have average Vickers hardnesses of 0.90 times or less of the average Vickers hardness of a sheet thickness ½ position of the steel sheet,
the first surface layer softened part has an average Vickers hardness of 1.05 times or more the average Vickers hardness of the second surface layer softened part, and
the tensile strength of the steel sheet is 980 MPa or more.

2. The steel sheet according to claim 1, wherein the first surface layer softened part has an average Vickers hardness of 2.00 times or more the average Vickers hardness of the second surface layer softened part.

3. The steel sheet according to claim 1, wherein the first surface layer softened part has an average thickness smaller than the average thickness of the second surface layer softened part.

4. The steel sheet according to claim 3, wherein the first surface layer softened part has an average thickness of ½ or less of the average thickness of the second surface layer softened part.

5. The steel sheet according to claim 1, wherein at least one of the first surface layer softened part and second surface layer softened part comprises an internal oxide layer.

6. The steel sheet according to claim 1, wherein the tensile strength is 1470 MPa or more.

7. The steel sheet according to claim 1, wherein the sheet thickness center part has a chemical composition comprising, by mass %,
C: 0.050 to 0.800%,
Si: 0.01 to 3.00%,
Mn: 0.01 to 10.00%,
Al: 0.001 to 0.500%,
P: 0.100% or less,
S: 0.050% or less,
N: 0.010% or less,
Cr: 0 to 3.000%,
Mo: 0 to 1.000%,
B: 0 to 0.0100%,
Ti: 0 to 0.500%,
Nb: 0 to 0.500%,
V: 0 to 0.500%,
Cu: 0 to 0.50%,
Ni: 0 to 0.50%,
O: 0 to 0.020%,
W: 0 to 0.100%,
Ta: 0 to 0.10%,
Co: 0 to 0.50%,
Sn: 0 to 0.050%,
Sb: 0 to 0.050%,
As: 0 to 0.050%,
Mg: 0 to 0.050%,
Ca: 0 to 0.050%,
Y: 0 to 0.050%,
Zr: 0 to 0.050%,
La: 0 to 0.050%,
Ce: 0 to 0.050%, and
balance: Fe and impurities.

8. The steel sheet according to claim 7, wherein the chemical composition comprises, by mass %, at least one of:
Cr: 0.001 to 3.000%,
Mo: 0.001 to 1.000%,
B: 0.0001 to 0.0100%,
Ti: 0.001 to 0.500%,
Nb: 0.001 to 0.500%,
V: 0.001 to 0.500%,
Cu: 0.001 to 0.50%,
Ni: 0.001 to 0.50%,
O: 0.0001 to 0.020%,
W: 0.001 to 0.100%,
Ta: 0.001 to 0.10%,
Co: 0.001 to 0.50%,
Sn: 0.001 to 0.050%,
Sb: 0.001 to 0.050%,
As: 0.001 to 0.050%,
Mg: 0.0001 to 0.050%,
Ca: 0.001 to 0.050%,
Y: 0.001 to 0.050%,
Zr: 0.001 to 0.050%,
La: 0.001 to 0.050%, and
Ce: 0.001 to 0.050%.

9. The steel sheet according to claim 2, wherein the first surface layer softened part has an average thickness smaller than the average thickness of the second surface layer softened part.

10. The steel sheet according to claim 2, wherein at least one of the first surface layer softened part and second surface layer softened part comprises an internal oxide layer.

11. The steel sheet according to claim 3, wherein at least one of the first surface layer softened part and second surface layer softened part comprises an internal oxide layer.

12. The steel sheet according to claim 4, wherein at least one of the first surface layer softened part and second surface layer softened part comprises an internal oxide layer.

13. The steel sheet according to claim 2, wherein the sheet thickness center part has a chemical composition comprising, by mass %,
C: 0.050 to 0.800%,
Si: 0.01 to 3.00%,
Mn: 0.01 to 10.00%,
Al: 0.001 to 0.500%,
P: 0.100% or less,
S: 0.050% or less,
N: 0.010% or less, Cr: 0 to 3.000%,
Mo: 0 to 1.000%,
B: 0 to 0.0100%,
Ti: 0 to 0.500%,
Nb: 0 to 0.500%,
V: 0 to 0.500%,
Cu: 0 to 0.50%,
Ni: 0 to 0.50%,
O: 0 to 0.020%,
W: 0 to 0.100%,
Ta: 0 to 0.10%,
Co: 0 to 0.50%,
Sn: 0 to 0.050%,
Sb: 0 to 0.050%,
As: 0 to 0.050%,
Mg: 0 to 0.050%,
Ca: 0 to 0.050%,
Y: 0 to 0.050%,
Zr: 0 to 0.050%,
La: 0 to 0.050%,
Ce: 0 to 0.050%, and
balance: Fe and impurities.

14. The steel sheet according to claim 3, wherein the sheet thickness center part has a chemical composition comprising, by mass %,
C: 0.050 to 0.800%,
Si: 0.01 to 3.00%,
Mn: 0.01 to 10.00%,
Al: 0.001 to 0.500%,
P: 0.100% or less,
S: 0.050% or less,
N: 0.010% or less,
Cr: 0 to 3.000%,
Mo: 0 to 1.000%,
B: 0 to 0.0100%,
Ti: 0 to 0.500%,
Nb: 0 to 0.500%,
V: 0 to 0.500%,
Cu: 0 to 0.50%,
Ni: 0 to 0.50%,
O: 0 to 0.020%,
W: 0 to 0.100%,
Ta: 0 to 0.10%,
Co: 0 to 0.50%,
Sn: 0 to 0.050%,
Sb: 0 to 0.050%,
As: 0 to 0.050%,
Mg: 0 to 0.050%,
Ca: 0 to 0.050%,
Y: 0 to 0.050%,
Zr: 0 to 0.050%,
La: 0 to 0.050%,
Ce: 0 to 0.050%, and
balance: Fe and impurities.

15. The steel sheet according to claim 4, wherein the sheet thickness center part has a chemical composition comprising, by mass %,
C: 0.050 to 0.800%,
Si: 0.01 to 3.00%,
Mn: 0.01 to 10.00%,
Al: 0.001 to 0.500%,
P: 0.100% or less,
S: 0.050% or less,
N: 0.010% or less,
Cr: 0 to 3.000%,
Mo: 0 to 1.000%,
B: 0 to 0.0100%,
Ti: 0 to 0.500%,
Nb: 0 to 0.500%,
V: 0 to 0.500%,
Cu: 0 to 0.50%,
Ni: 0 to 0.50%,
O: 0 to 0.020%,
W: 0 to 0.100%,
Ta: 0 to 0.10%,
Co: 0 to 0.50%,
Sn: 0 to 0.050%,
Sb: 0 to 0.050%,
As: 0 to 0.050%,
Mg: 0 to 0.050%,
Ca: 0 to 0.050%,
Y: 0 to 0.050%,
Zr: 0 to 0.050%,
La: 0 to 0.050%,
Ce: 0 to 0.050%, and
balance: Fe and impurities.

* * * * *